US012490204B2

(12) United States Patent
Ben-Ari et al.

(10) Patent No.: US 12,490,204 B2
(45) Date of Patent: Dec. 2, 2025

(54) ADJUSTING TRANSMISSION TIMING OF A SYNCHRONIZATION SIGNAL BASED ON A RECEIVED SYNCHRONIZATION SIGNAL TIMING

(71) Applicant: QUALCOMM Incorporated, San Diego, CA (US)

(72) Inventors: Moshe Ben-Ari, Rehovot (IL); Guy Spiegelstein, Nes-Ziona (IL); Shay Landis, Hod Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 352 days.

(21) Appl. No.: 17/662,015

(22) Filed: May 4, 2022

(65) Prior Publication Data

US 2023/0362844 A1 Nov. 9, 2023

(51) Int. Cl.
*H04W 56/00* (2009.01)
(52) U.S. Cl.
CPC ....... *H04W 56/001* (2013.01); *H04W 56/003* (2013.01); *H04W 56/0045* (2013.01)

(58) Field of Classification Search
CPC ............. H04W 56/001; H04W 56/003; H04W 56/0045; H04W 56/0015
See application file for complete search history.

(56) References Cited

U.S. PATENT DOCUMENTS

| | | | |
|---|---|---|---|
| 2019/0082411 A1* | 3/2019 | Feng | H04W 56/0025 |
| 2022/0053440 A1* | 2/2022 | Kim | H04W 92/18 |
| 2022/0061003 A1* | 2/2022 | Wang | H04W 56/001 |
| 2022/0361128 A1* | 11/2022 | Singh | H04W 56/001 |

\* cited by examiner

*Primary Examiner* — Jung H Park
(74) *Attorney, Agent, or Firm* — Harrity & Harrity, LLP

(57) ABSTRACT

Various aspects of the present disclosure generally relate to wireless communication. In some aspects, a first user equipment (UE) may receive, from a second UE, a second synchronization signal at a reception time. The first UE may adjust a transmission time of a first synchronization signal, resulting in an adjusted transmission time, wherein the adjusted transmission time is based at least in part on the reception time of the second synchronization signal. The first UE may transmit the first synchronization signal at the adjusted transmission time. Numerous other aspects are described.

26 Claims, 10 Drawing Sheets

ADJUSTING TRANSMISSION TIMING OF A SYNCHRONIZATION SIGNAL BASED ON A RECEIVED SYNCHRONIZATION SIGNAL TIMING

FIELD OF THE DISCLOSURE

Aspects of the present disclosure generally relate to wireless communication and to techniques and apparatuses for adjusting transmission timing of a synchronization signal based on a received synchronization signal timing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include receiving, from a second UE, a second synchronization signal at a reception time. The method may include adjusting a transmission time of a first synchronization signal, resulting in an adjusted transmission time, wherein the adjusted transmission time is based at least in part on the reception time of the second synchronization signal. The method may include transmitting the first synchronization signal at the adjusted transmission time.

Some aspects described herein relate to an apparatus for wireless communication at a first UE. The apparatus may include a memory and one or more processors coupled to the memory. The one or more processors may be configured to receive, from a second UE, a second synchronization signal at a reception time. The one or more processors may be configured to adjust a transmission time of a first synchronization signal, resulting in an adjusted transmission time, wherein the adjusted transmission time is based at least in part on the reception time of the second synchronization signal. The one or more processors may be configured to transmit the first synchronization signal at the adjusted transmission time.

Some aspects described herein relate to a non-transitory computer-readable medium that stores a set of instructions for wireless communication by a first UE. The set of instructions, when executed by one or more processors of the first UE, may cause the first UE to receive, from a second UE, a second synchronization signal at a reception time. The set of instructions, when executed by one or more processors of the first UE, may cause the first UE to adjust a transmission time of a first synchronization signal, resulting in an adjusted transmission time, wherein the adjusted transmission time is based at least in part on the reception time of the second synchronization signal. The set of instructions, when executed by one or more processors of the first UE, may cause the first UE to transmit the first synchronization signal at the adjusted transmission time.

Some aspects described herein relate to an apparatus for wireless communication. The apparatus may include means for receiving, from a UE, a second synchronization signal at a reception time. The apparatus may include means for adjusting a transmission time of a first synchronization signal, resulting in an adjusted transmission time, wherein the adjusted transmission time is based at least in part on the reception time of the second synchronization signal. The apparatus may include means for transmitting the first synchronization signal at the adjusted transmission time.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
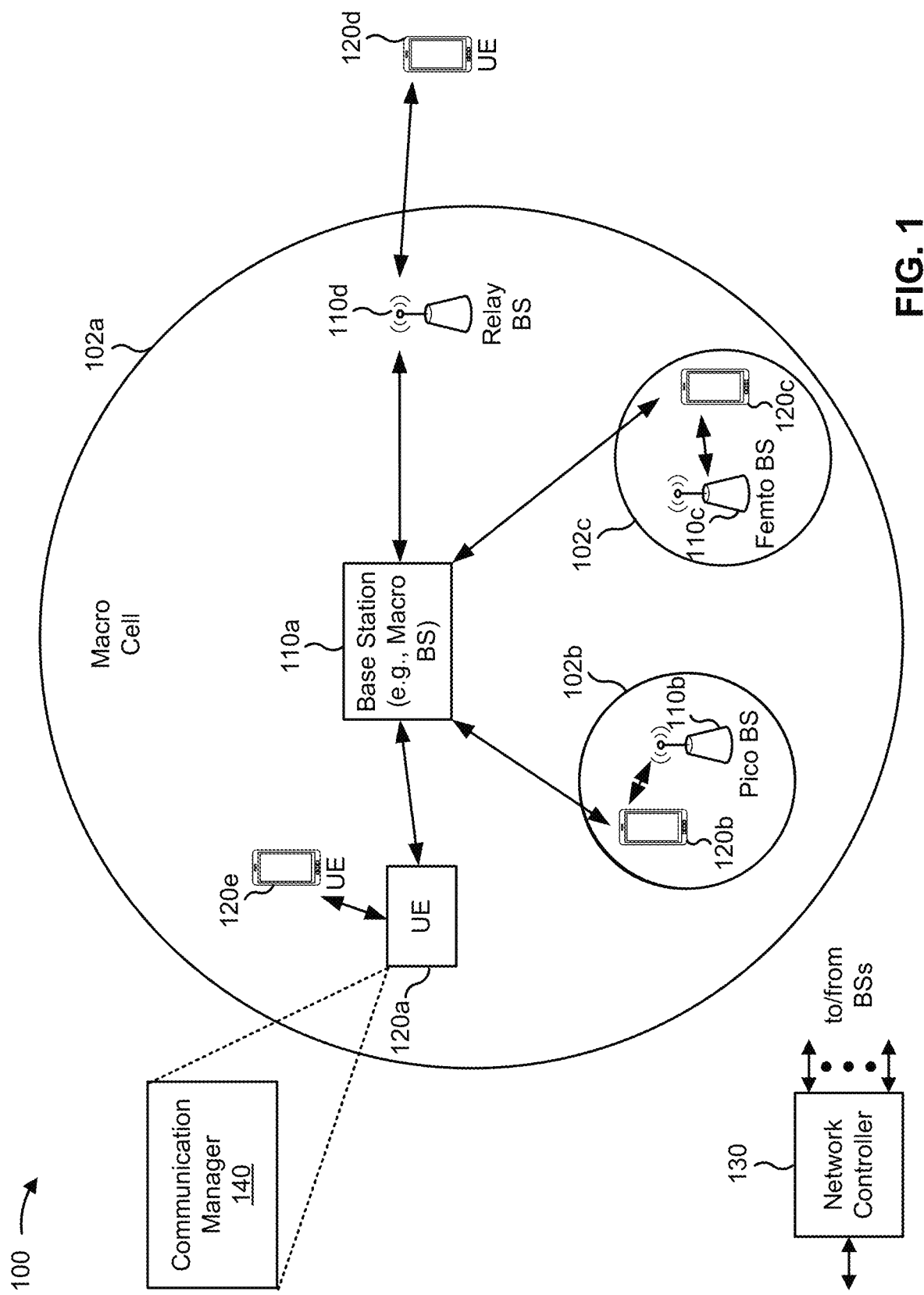
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although the base station 110 is depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from another UE, a second synchronization signal at a reception time; adjust a transmission time of a first synchronization signal, resulting in an adjusted transmission time, wherein the adjusted transmission time is based at least in part on the reception time of the second synchronization signal; and transmit the first synchronization signal at the adjusted transmission time. Additionally, or alternatively, the communication manager 140 may perform one or more other operations described herein.

As indicated above, FIG. 1 is provided as an example. Other examples may differ from what is described with regard to FIG. 1.

Figure 2:
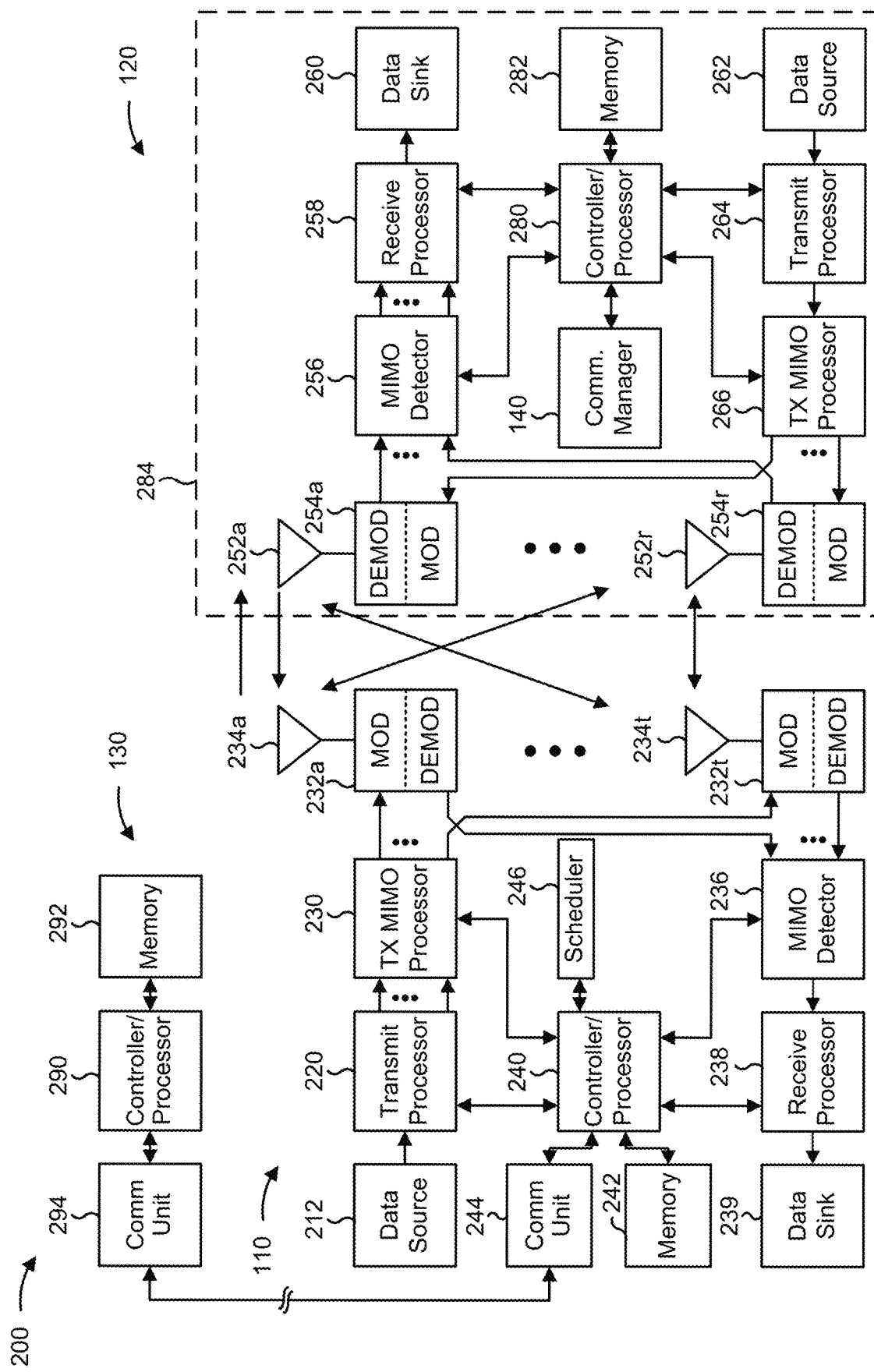
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of noncoplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-10).

The controller/processor 240 of the base station 110, the controller/processor 280 of the UE 120, and/or any other component(s) of FIG. 2 may perform one or more techniques associated with adjusting transmission timing of a synchronization signal based on a received synchronization signal timing, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from another UE, a second synchronization signal at a reception time; means for adjusting a transmission time of a first synchronization signal, resulting in an adjusted transmission time, wherein the adjusted transmission time is based at least in part on the reception time of the second synchronization signal; and/or means for transmitting the first synchronization signal at the adjusted transmission time. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
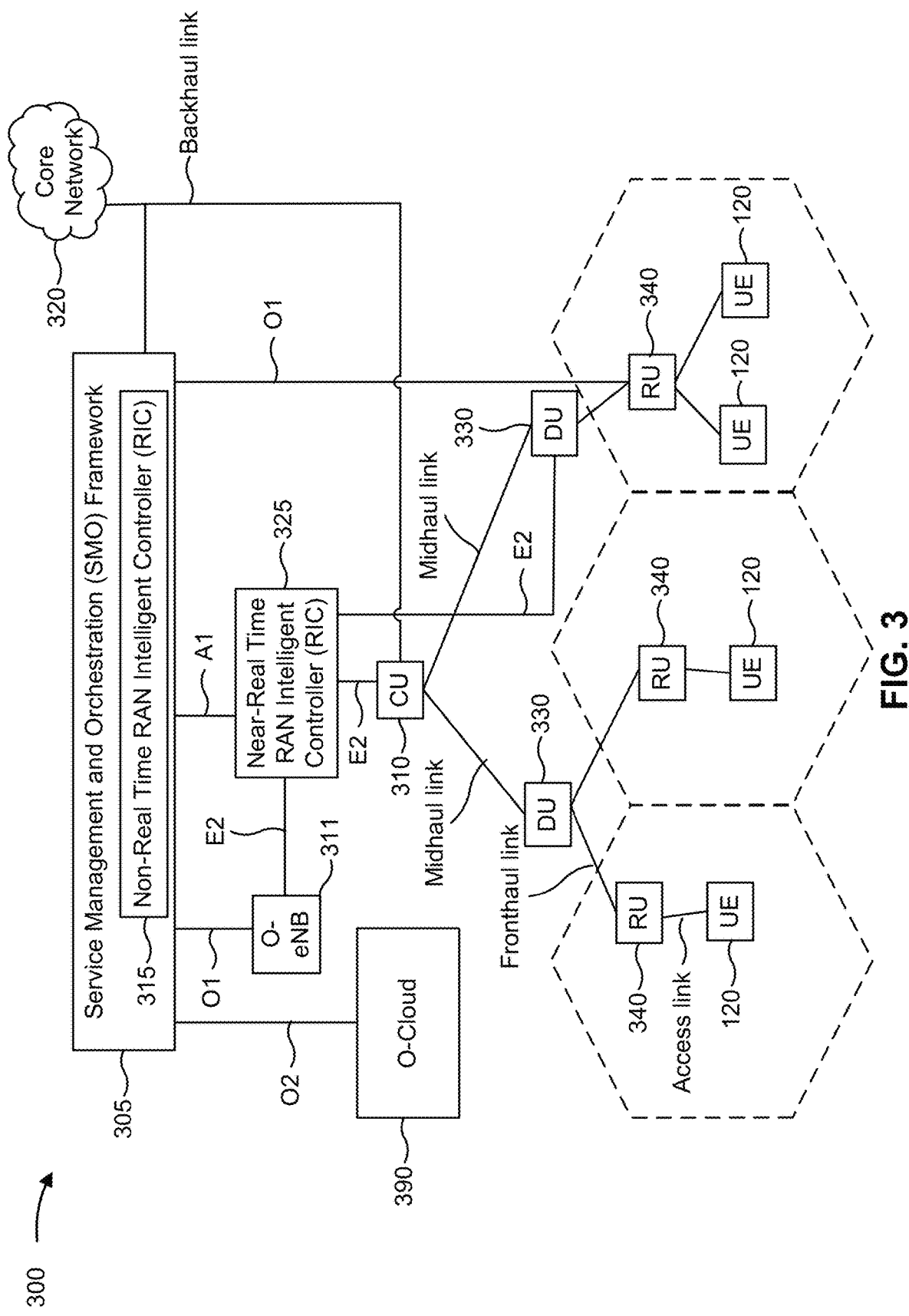
FIG. 3 is a diagram illustrating an example of a disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU). "Network entity" or "network node" can refer to a disaggregated base station, or to one or more units of a disaggregated base station (such as one or more CUs, one or more DUs, one or more RUs, or a combination thereof). "Network entity" or "network node" can refer to a disaggregated base station, or to one or more units of a disaggregated base station (such as one or more CUs, one or more DUs, one or more RUs, or a combination thereof).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
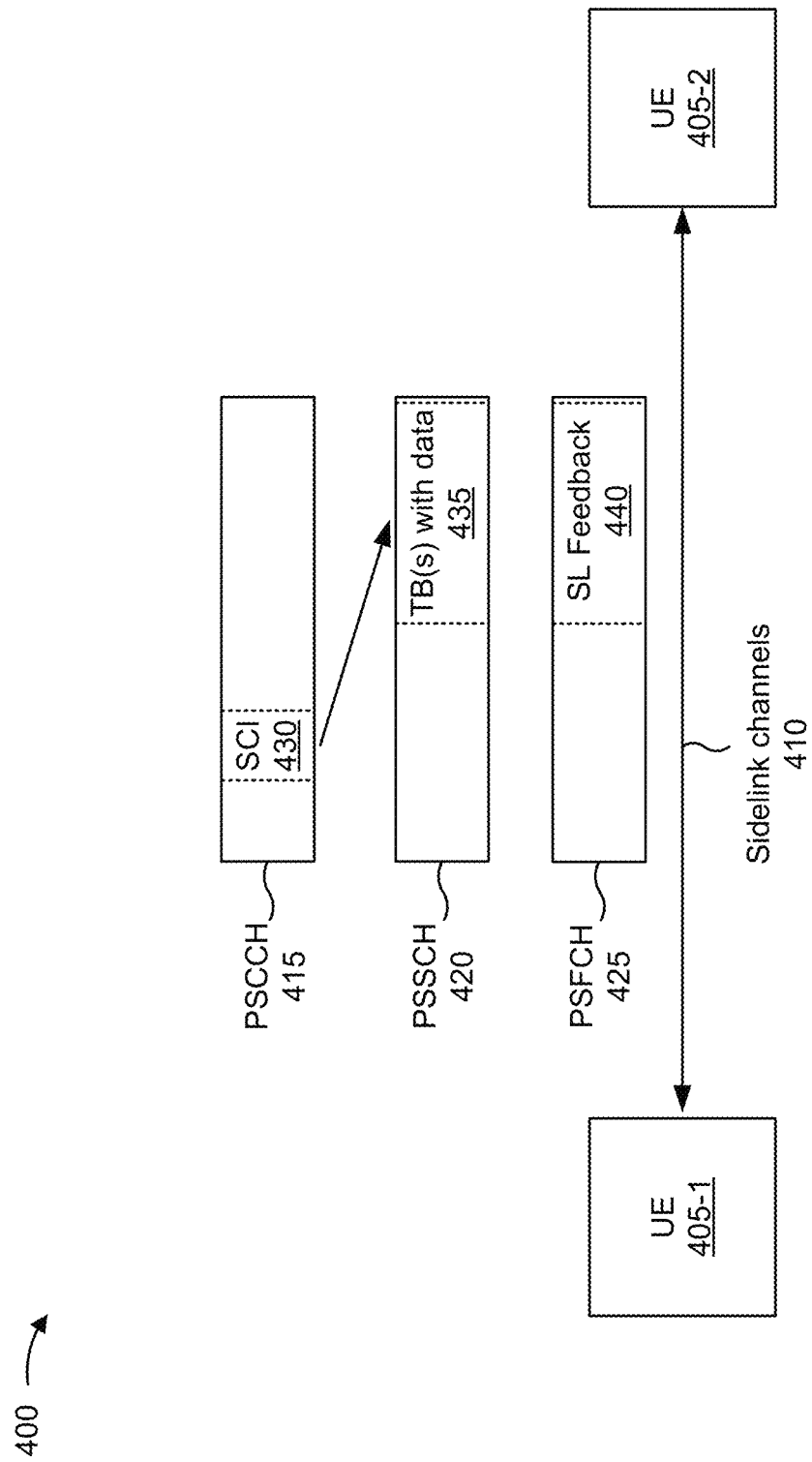
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications), cellular V2X (CV2X) communications, and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in an RRC message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
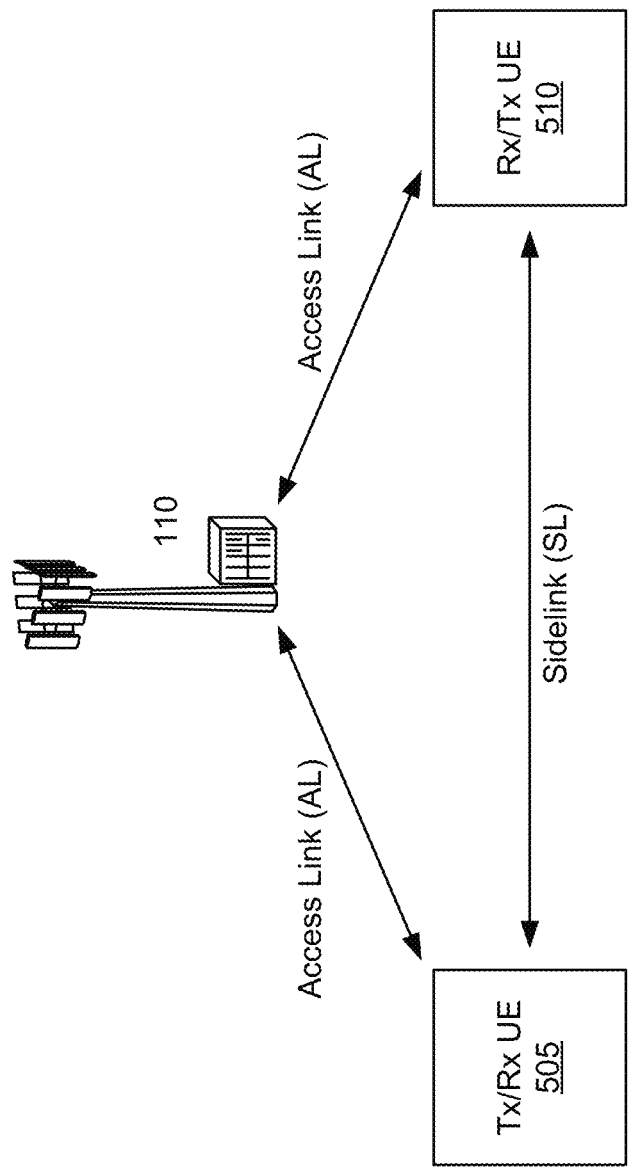
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
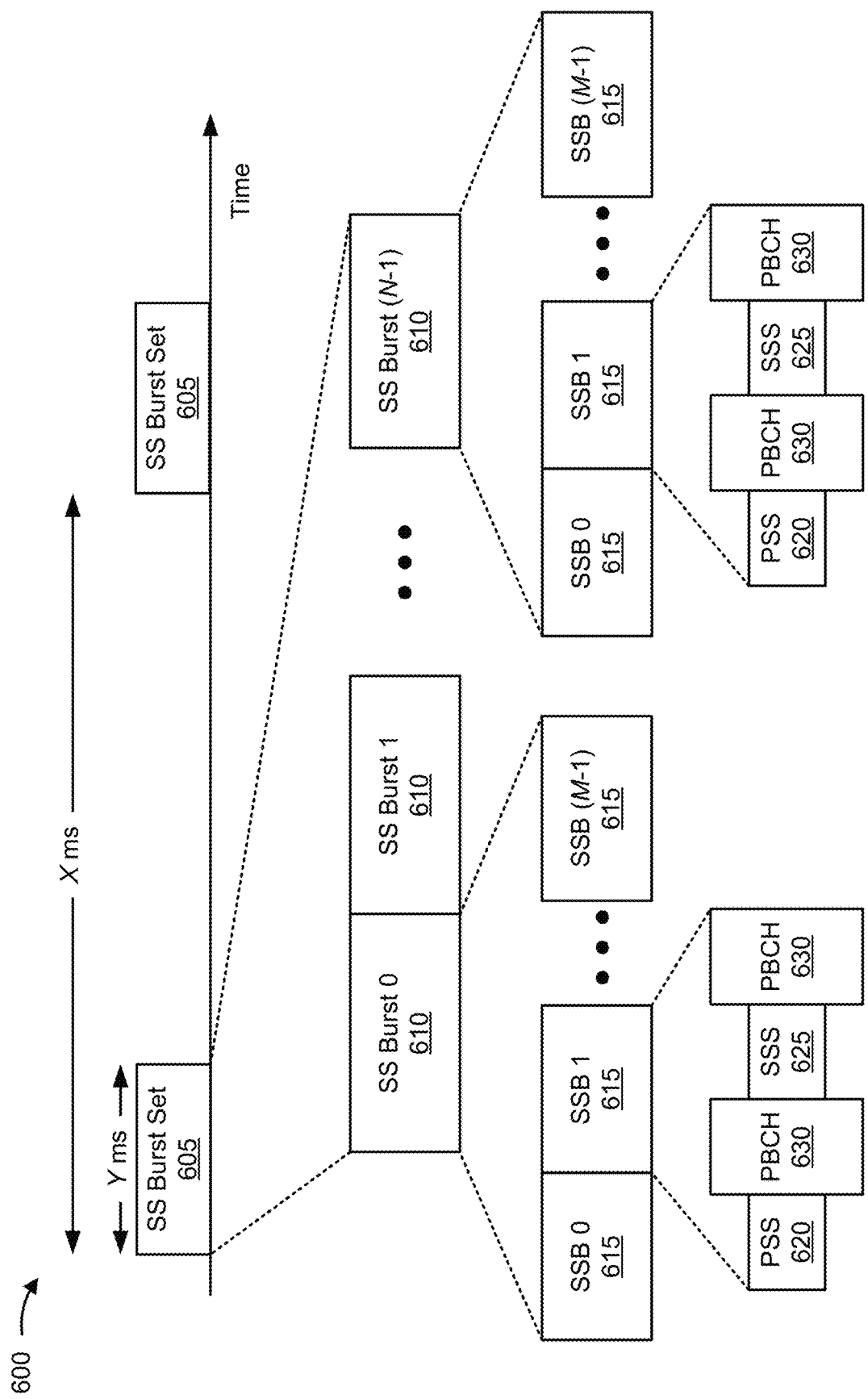
FIG. 6 is a diagram illustrating an example of a synchronization signal (SS) hierarchy, in accordance with the present disclosure.

FIG. 6 is a diagram illustrating an example 600 of a synchronization signal (SS) hierarchy, in accordance with the present disclosure.

In some aspects, a UE 120 may synchronize cell timing via an SS received from the network, such as an SS transmitted via a base station 110, a CU 310, a DU 330, and RU 340, or a similar network node. As shown in FIG. 6, the SS hierarchy may include an SS burst set 605, which may include multiple SS bursts 610, shown as SS burst 0 through SS burst N−1, where N is a maximum number of repetitions of the SS burst 610 that may be transmitted by the base station. As further shown, each SS burst 610 may include one or more SS blocks (SSBs) 615, shown as SSB 0 through SSB M−1, where M is a maximum number of SSBs 615 that can be carried by an SS burst 610. In some aspects, different SSBs 615 may be beam-formed differently (e.g., transmitted using different beams), and may be used for cell search, cell acquisition, beam management, and/or beam selection (e.g., as part of an initial network access procedure). An SS burst set 605 may be periodically transmitted by a wireless node (e.g., a base station 110, a CU 310, a DU 330, an RU 340, or the like), such as every X milliseconds, as shown in FIG. 6. In some aspects, an SS burst set 605 may have a fixed or dynamic length, shown as Y milliseconds in FIG. 6. In some cases, an SS burst set 605 or an SS burst 610 may be referred to as a discovery reference signal (DRS) transmission window or an SSB measurement time configuration (SMTC) window.

In some aspects, an SSB 615 may include resources that carry a PSS 620, an SSS 625, and/or a physical broadcast channel (PBCH) 630. In some aspects, multiple SSBs 615 are included in an SS burst 610 (e.g., with transmission on different beams), and the PSS 620, the SSS 625, and/or the PBCH 630 may be the same across each SSB 615 of the SS burst 610. In some aspects, a single SSB 615 may be included in an SS burst 610. In some aspects, the SSB 615 may be at least four symbols (e.g., OFDM symbols) in length, where each symbol carries one or more of the PSS 620 (e.g., occupying one symbol), the SSS 625 (e.g., occupying one symbol), and/or the PBCH 630 (e.g., occupying two symbols). In some aspects, an SSB 615 may be referred to as an SS/PBCH block.

In some aspects, the symbols of an SSB 615 are consecutive, as shown in FIG. 6. In some aspects, the symbols of an SSB 615 are non-consecutive. Similarly, in some aspects, one or more SSBs 615 of the SS burst 610 may be transmitted in consecutive radio resources (e.g., consecutive symbols) during one or more slots. Additionally, or alternatively, one or more SSBs 615 of the SS burst 610 may be transmitted in non-consecutive radio resources.

In some aspects, the SS bursts 610 may have a burst period, and the SSBs 615 of the SS burst 610 may be transmitted by a wireless node (e.g., a base station 110, a CU 310, a DU 330, an RU 340, or the like) according to the burst period. In this case, the SSBs 615 may be repeated during each SS burst 610. In some aspects, the SS burst set 605 may have a burst set periodicity, whereby the SS bursts 610 of the SS burst set 605 are transmitted by the wireless node according to the fixed burst set periodicity. In other words, the SS bursts 610 may be repeated during each SS burst set 605.

In some aspects, an SSB 615 may include an SSB index, which may correspond to a beam used to carry the SSB 615. A UE 120 may monitor for and/or measure SSBs 615 using different Rx beams during an initial network access procedure and/or a cell search procedure, among other examples. Based at least in part on the monitoring and/or measuring, the UE 120 may indicate one or more SSBs 615 with a best signal parameter (e.g., a reference signal received power (RSRP) parameter) to a base station 110. The base station 110 and the UE 120 may use the one or more indicated SSBs 615 to select one or more beams to be used for communication between the base station 110 and the UE 120 (e.g., for a random access channel (RACH) procedure). Additionally, or alternatively, the UE 120 may use the SSB 615 and/or the SSB index to determine a cell timing for a cell via which the SSB 615 is received (e.g., a serving cell).

For UEs operating in the sidelink, such as the first UE 405-1 or the second UE 405-2 described in connection with FIG. 4, or such as the Tx/Rx UE 505 or the Rx/Tx UE 510 described in connection with FIG. 5, each of the UEs may not be in communication with a network (e.g., via a base station 110, a CU 310, a DU 330, an RU 340, or the like or the like) and/or two communicating UEs may not be in communication with the same network. Accordingly, UEs operating in the sidelink may synchronize timing of TTIs (e.g., frames, subframes, slots, or symbols) using GNSS timing instead of or in addition to using an SSB 116 received from the network. For example, in CV2X applications, safety messages or the like may be transferred on the sidelink between an onboard unit (OBU) and other OBUs and/or roadside units (RSUs), and such communications may be synchronized based on a GNSS.

If a GNSS is unavailable, however, such as when an OBU travels through a tunnel with no clear view of GNSS satellites, the OBUs may lose the global synchronization source (e.g., the GNSS) and thus the ability to synchronize timing with other UEs. This may result in unsynchronized TTIs among the various OBUs and/or other UEs, with subframe boundaries, system frame numbers (SFNs), or the like not being available for demodulation, leading to distorted messaging or even sidelink failure.

In some aspects, UEs communicating on the sidelink may thus optionally synchronize timing of TTIs using a sidelink SS (SLSS). An SLSS is a periodic SS transmitted by a UE that enables receiving UEs to synchronize timing of TTIs, among other purposes. For example, in the case of an OBU traveling through a tunnel where GNSS is unavailable, the OBU may sync to another UE in the tunnel (e.g., an RSU) via an SLSS transmitted by the other UE, enabling the OBU to communicate with other OBUs or the like, notwithstanding the inability to communicate with a global synchronization source (e.g., the GNSS). In some cases, a series of RSUs may be employed in a tunnel for purposes of transmitting SLSS signals to OBUs and other UEs within the tunnel, with each RSU ultimately synchronized to a master synchronized referenced (e.g., a GNSS) through a chain of RSUs, which will be described in more detail in connection with FIG. 7.

In some aspects, an SLSS may be transmitted in a block in a similar manner as described above in connection with the SSBs 615. More particularly, UEs may be configured to transmit a sidelink SS/physical sidelink broadcast channel (PSBCH) block (S-SS/PSBCH block), analogous to the SSB 615 (e.g., the SS/PBCH block). In that regard, the sidelink S-SS/PSBCH block includes a sidelink PSS (S-PSS), similar to the PSS 620 described above, a sidelink SSS (S-SSS), similar to the SSS 625 described above, and a PSBCH, similar to the PBCH 630 described above. In some aspects, the S-SS/PSBCH block may cover a number of resource blocks (e.g., six resource blocks, eleven resource blocks, or another number of resource blocks) in the frequency domain, and may cover thirteen symbols in the time domain. Two of the symbols may be used for the S-PSS, two of the symbols may be used for the S-SSS, and the remaining nine symbols may be used for the PSBCH.

In some aspects, UEs communicating on the sidelink may synchronize timing of TTIs using a chain of SLSSs (e.g., a chain of S-SS/PSBCHs). For example, a first UE that is in communication with a global synchronization source (e.g., the GNSS) may synchronize timing with the global synchronization source, and transmit a first SLSS according to the GNSS timing. A second UE may receive the first SLSS, synchronize its timing according to a reception time of the first SLSS, and transmit a second SLSS accordingly. A third UE may receive the second SLSS, synchronize its timing according to a reception time of the second SLSS, and transmit a third SLSS accordingly, and so forth. In this way, each UE is ultimately synchronized to the global synchronization source, such as the GNSS or the like, via a chain of UEs transmitting respective SLSSs, as described in more detail in connection with FIG. 7.

As indicated above, FIG. 6 is provided as an example. Other examples may differ from what is described with regard to FIG. 6.

Figure 7:
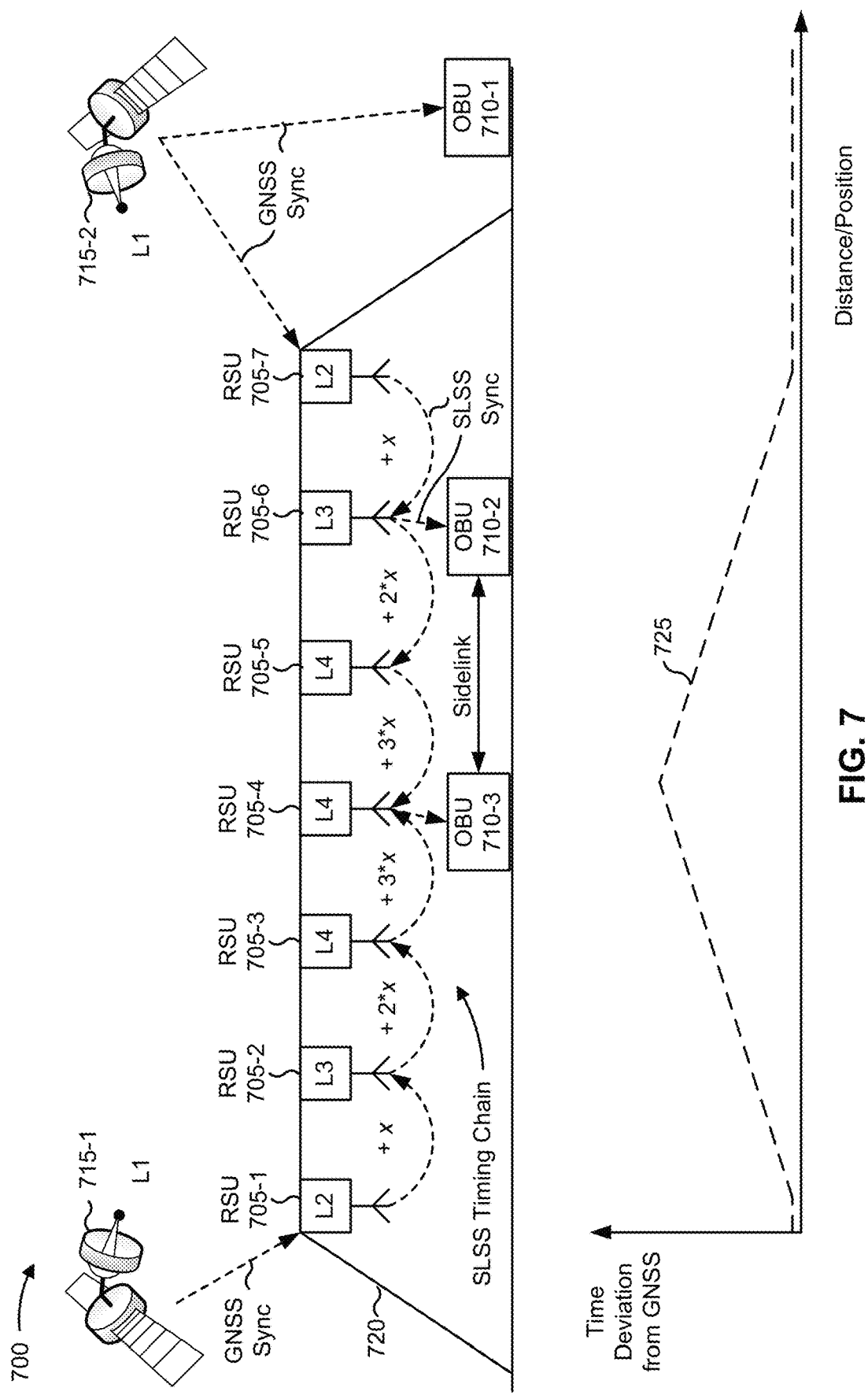
FIG. 7 is a diagram illustrating an example of sidelink SS timing chain, in accordance with the present disclosure.

FIG. 7 is a diagram illustrating an example 700 of an SLSS timing chain, in accordance with the present disclosure.

As shown in FIG. 7, multiple RSUs 705 and/or multiple OBUs 710 may communicate with one another via the sidelink, forming an SLSS timing chain. More particularly, each RSU 705 and/or each OBU 710 may synchronize to the GNSS via a direct link (shown as a GNSS sync in FIG. 7) or via an indirect link (e.g., via one or more other UEs, such as via one or more RSUs 705, shown as an SLSS timing chain in FIG. 7). More particularly, the SLSS timing chain may be formed by a series of RSUs 705 that are located within a structure 720 (e.g., a tunnel or the like) that obstructs some communication with satellites 715 (e.g., a first satellite 715-1 and/or a second satellite 715-2) forming part of the GNSS. RSUs 705 at the end of the SLSS timing chain (e.g., a first RSU 705-1 and a seventh RSU 705-7), as well as a first OBU 710-1 that is outside of the structure 720, may have an unobstructed line of communication with the satellites 715, and thus may synchronize directly to the GNSS via a direct link (shown as a GNSS sync in FIG. 7) with one or more of the satellites 715. The satellites 715, which provide the global SS, are sometimes referred to as level 1 devices (shown as "L1" in FIG. 7), while devices that directly communicate with the level 1 devices and thus receive the global SS from the level 1 devices (such as, in the depicted example, the first OBU 710-1, the first RSU 705-1, and the seventh RSU 705-7) are sometimes referred to as level 2 devices (shown as "L2" in FIG. 7).

The remaining RSUs 705 (e.g., the second RSU 705-2, the third RSU 705-3, the fourth RSU 705-4, the fifth RSU 705-5, and the sixth RSU 705-6) and/or the OBUs 710 located within the structure 720 (e.g., a second OBU-2 and a third OBU 710-3) may not have a direct link with the GNSS, and instead may establish timing via one or more SLSSs, as described in connection with FIG. 6. For example, as shown in FIG. 7, the RSUs 705 may synchronize to the GNSS via the SLSS timing chain, with each subsequent RSU 705 relaying the GNSS timing via respective SLSSs. More particularly, the second RSU 705-2 may synchronize to the first RSU 705-1, the third RSU 705-3 may synchronize to the second RSU 705-2, the fourth RSU 705-4 may synchronize to the third RSU 705-3 and/or to the fifth RSU 705-5, the fifth RSU 705-5 may synchronize to the sixth RSU 705-6, and the sixth RSU 705-6 may synchronize to the seventh RSU 705-7. In such aspects, RSUs 705 that are synchronized to a level 2 device are sometimes referred to as level 3 devices (shown as "L3" in FIG. 4), and RSUs that are synchronized to a level 3 device are sometimes referred to as level 4 devices (shown as "L4" in FIG. 4). Moreover, RSUs 705 that are synchronized to a level 4 device, such as the fourth RSU 705-4 in FIG. 4, are sometimes also referred to as level 4 devices (e.g., level 4 may be the highest level within an SLSS timing chain).

As described in connection with FIG. 6, each RSU 705 may synchronize TTIs (e.g., subframe boundaries) based on an SLSS (e.g., a S-SS/PSBCH block) transmitted by another RSU 705. For example, a level 3 RSU 705 (e.g., the second RSU 705-2 and the sixth RSU 702-6) may synchronize to an SLSS transmitted by a level 2 RSU 705 (e.g., the first RSU 705-1 and the seventh RSU 702-7), and a level 4 RSU 705 (e.g., the third RSU 705-3, the fourth RSU 702-4, and the fifth RSU 705-5) may synchronize to an SLSS transmitted by a level 3 RSU 705 or by another level 4 RSU 705 (e.g., the third RSU 705-3 and the fifth RSU 705-5 may synchronize to the second RSU 705-2 and the sixth RSU 705-6, respectively, and the fourth RSU 705-4 may synchronize to one of the third RSU 705-3 or the fifth RSU 705-5). More generally, an RSU 705 may synchronize TTIs based on an earliest arriving SLSS from one or more other RSUs 705.

However, due to propagation delays that accumulate along the SLSS timing chain, each RSU 705's timing may differ from another RSU 705's timing, with the timing of RSUs 705 located near the center of the timing chain (e.g., located farthest from the level 2 devices) experiencing the largest deviation from GNSS timing. More particularly, for relatively evenly spaced RSUs 705 having an average propagation delay of x microseconds between adjacent RSUs 705, the timing of the level 2 RSUs 705 may not deviate or may only deviate slightly from GNSS timing, because the level 2 RSUs 705 are synchronized to the GNSS via a direct link with one or more satellites 715, as described. However, the timing of level 3 RSUs 705 may differ from the timing of level 2 RSUs 705 (and thus the GNSS timing) by a time period approximately equal to the propagation delay, x microseconds, because an SLSS transmitted by a level 2 RSUs 705 may take approximately x microseconds to arrive at the level 3 RSUs 705. Put another way, when a level 3 RSU 705 synchronizes to a level 2 RSU via an arrived SLSS, the level 3 RSU 705 does so by synchronizing to the arrival time of an SLSS transmitted by the level 2 RSU 705, and therefore the level 3 RSU 705 timing may be off by the propagation delay, x microseconds. Similarly, timing of level 4 RSUs 705 that are synchronizing to level 3 RSUs 705 may differ from timing of level 3 RSUs 705 again by the propagation delay, x microseconds, while timing of level 4 RSUs 705 that are synchronizing to other level 4 RSUs 705 may differ from timing of the other level 4 RSUs 705 again by the propagation delay, x microseconds, and so forth.

In this way, and as shown in FIG. 7, the timing of the level 3 RSUs 705 may deviate from GNSS timing by approximately x microseconds, the timing of the level 4 RSUs 705 that synchronize to level 3 RSUs 705 may deviate from GNSS timing by approximately 2*x microseconds, the timing of the level 4 RSUs 705 that synchronize to other 4 RSUs 705 may deviate from GNSS timing by approximately 3*x microseconds, and so forth. More generally, as shown by the curve indicated by reference number 725, within the SLSS timing chain a deviation from GNSS timing may generally increase from a lowest deviation near ends of the structure 720 (e.g., near exits of a tunnel or the like) toward a peak deviation from GNSS timing at or near a center of the structure 720 (e.g., at or near a point farthest from a level 2 RSU 705).

Similarly, UEs within the structure 720, such as the second OBU 710-2 and the third OBU 710-3, that synchronize to the various RSUs 705 may experience deviations from GNSS timing and/or from one another. For example, the second OBU 710-2 may synchronize, via an SLSS, to a level 3 RSU 705 (e.g., the sixth RSU 705-6) having a first timing, while the third OBU 710-3 may synchronize, via an SLSS, to a level 4 RSU 705 (e.g., the fourth RSU 705-4) having a different timing. Thus, the timings of the two OBUs 710 may differ from each other, compromising the ability of the OBUs 710 to coherently communicate via the sidelink. Moreover, the timing difference between distant RSUs 705 may lead to an unstable condition where different groups of RSUs 705 are caught in different feedback loops, resulting in a timing of a first group of RSUs 705 drifting from a timing of a second group of RSUs 705, resulting in drastic timing differences along the length of the structure 720. As a result, the timing differences among RSUs 705 and/or OBUs 710 within the structure 720 may lead to degraded link quality, high latency, decreased throughput, and otherwise unreliable sidelink communications.

Some techniques and apparatuses described herein enable increased sidelink quality by ensuring a convergence and stability of an SLSS timing chain within a tunnel or the like. In some aspects, a first UE (such as an RSU 705, or the like) may receive, from a second UE (such as another RSU 705, or the like), a second SS, such as an SLSS, at a reception time. The first UE may synchronize a transmission timing of a first SS (e.g., an SLSS) based at least in part on the reception time of the second SS and by compensating for a propagation delay associated with the second SLSS in order to minimize a deviation between a timing of the first UE and that of the second UE (and thus minimize a deviation between the timing of the first UE and that of a global timing, such as GNSS timing or the like). In some aspects, the first UE may compensate for the propagation delay associated with the second SS by adjusting the first UE's SLSS transmission timing based at least in part on a compensation value that is associated with an estimated absolute timing delay between the first UE and the second UE. Moreover, in some aspects, in order to stabilize the SLSS timing chain, the first UE may adjust the first UE's transmission timing based at least in part on the compensation value multiplied by a stabilization factor, which may be based at least in part on certain factors such as a variation in distances between UEs in the SLSS timing chain, an error associated with the estimated absolute timing delay between the first UE and the second UE, a probability that the first UE will receive synchronization signals from additional UEs, or the like. In this regard, timing deviations along an SLSS timing chain may be minimized, resulting in improved sidelink quality, reduced latency among sidelink communications, increased sidelink throughput, and overall more reliable sidelink communications.

As indicated above, FIG. 7 is provided as an example. Other examples may differ from what is described with regard to FIG. 7.

Figure 8:
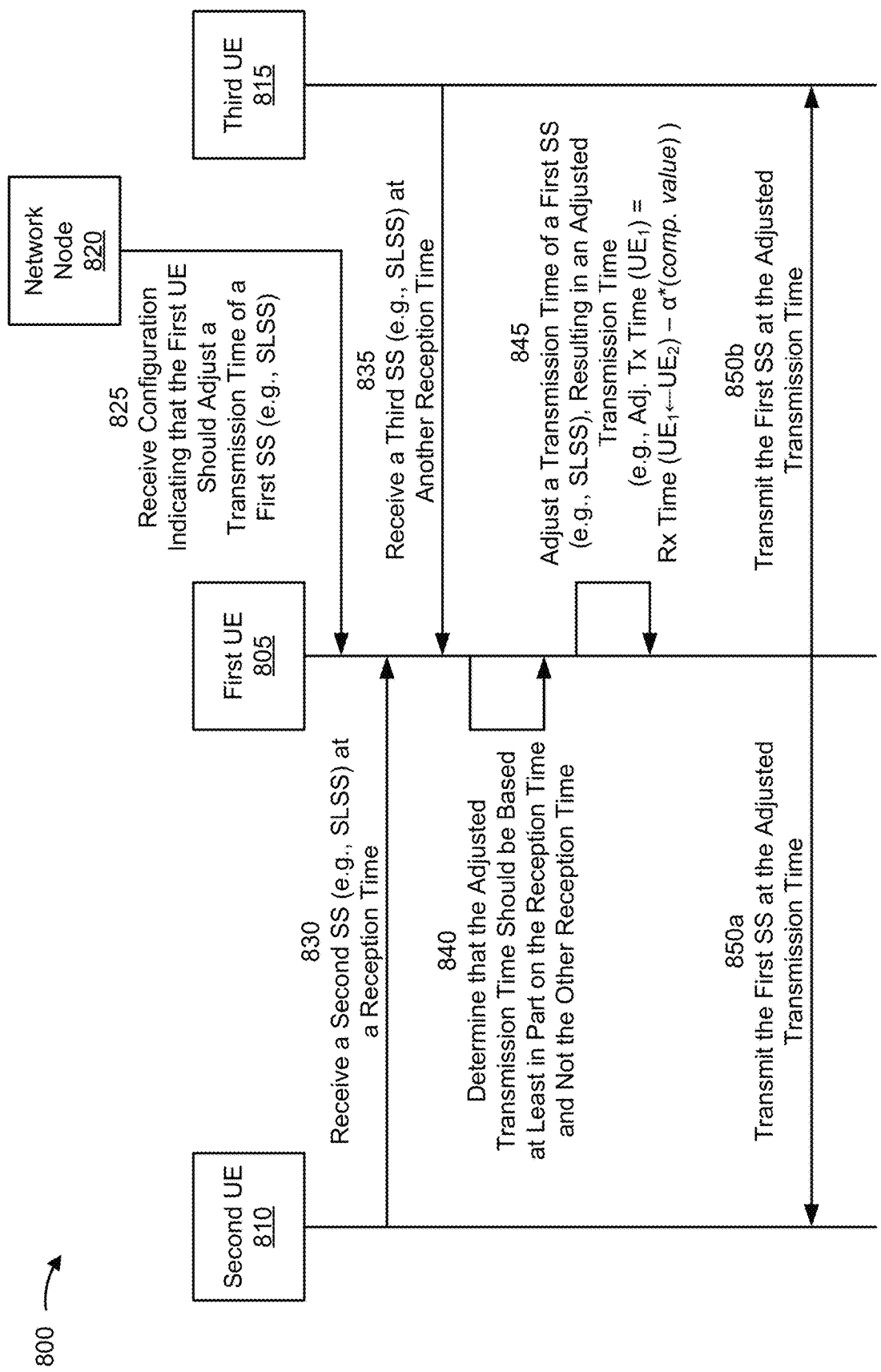
FIG. 8 is a diagram illustrating an example associated with an adjusted transmission timing of an SS, in accordance with the present disclosure.

FIG. 8 is a diagram illustrating an example 800 associated with an adjusted transmission timing of an SS, in accordance with the present disclosure. As shown in FIG. 8, a first UE 805, a second UE 810, a third UE 815, and a network node 820 may communicate with one another. The first UE 805, the second UE 810, and the third UE 815 may correspond to any of the UEs described herein. For example, the first UE 805, the second UE 810, and the third UE 815 may each be one of the RSUs 705 described in connection with FIG. 7. Moreover, the network node 820 may correspond to any of the network entities and/or network nodes described herein, such as the base station 110, a CU 310, a DU 330, an RU 340, or a similar network node.

As shown by reference number 825, the first UE 805 may receive, from the network node 820, a configuration indicating that the first UE 805 should adjust a transmission time of a first SS. As described in more detail below, the first SS may be an SLSS (e.g., an S-SS/PSBCH block), with a transmission time thereof adjusted in order to compensate for a propagation delay between the first UE 805 and other UEs in an SLSS timing chain, such as the SLSS timing chain described in connection with FIG. 7. For example, the first UE 805 may be a level 3 or a level 4 RSU 705 described in connection with FIG. 7, and the configuration indicated by reference number 825 may indicate that first UE 805 should adjust a transmission time of the first SS in order to compensate for a propagation delay (e.g., x microseconds) between the first UE 805 and a neighboring UE (e.g., a neighboring RSU 705) from which the first UE 805 is basing its timing.

The configuration indicated by reference number 825 may be transmitted from network node 820 to the first UE 805 using layer 1 signaling (e.g., a DCI message, or the like), layer 2 signaling (e.g., a MAC control element (MAC-CE) message, or the like), layer 3 signaling (e.g., an RRC message, or the like), or similar signaling. In some aspects, the configuration indicated by reference number 825 may be transmitted by the network node 820 using a spare bit in a master information block (MIB) communication. Moreover, in some other aspects, the first UE 805 may be pre-configured (e.g., hard-coded, or the like) with the configuration indicating that the first UE 805 should adjust the transmission time of the first SS. Put another way, the first UE 805 may be configured to adjust the transmission time of the first SS without receiving dedicated signaling from the network node 820 or the like.

In some aspects, the configuration indicated by reference number 825 may include additional parameters or indications associated with adjusting the transmission time of the first SS. For example, and as described in more detail below, in some aspects the first UE 805 may adjust the transmission time of the first SS based at least in part on a compensation value associated with the propagation delay between the first UE 805 and the second UE 810. In such aspects, the configuration indicated by reference number 825 may further indicate the compensation value. Additionally, or alternatively, in some aspects, the first UE 805 may adjust the transmission time of the first SS based at least in part on the compensation value being scaled by a stabilization factor. In such aspects, the configuration indicated by reference number 825 may further indicate the stabilization factor.

As shown by reference number 830, in some aspects, the first UE 805 may receive, from the second UE 810, a second SS (e.g., a second SLSS and/or S-SS/PSBCH block) at a reception time. For example, in some aspects, the first UE 805 may be one of the RSUs 705 described in connection with FIG. 7 that is not synchronized with the GNSS (e.g., that cannot set its timing based on the GNSS), and the second UE 810 may be a neighboring RSU 705 that, in some aspects, may be a level 2 RSU 705 (e.g., an RSU 705 that is in communication with the GNSS) or may be nearer to a level 2 RSU 705 than the first UE 805 (e.g., an RSU 705 that, like the first UE 805, is not synchronized with the GNSS but nonetheless is nearer to the GNSS than the first UE 805). In this way, the second UE 810 may provide a link in the SLSS timing chain to the global SS (e.g., an SS transmitted by the GNSS).

In some aspects, the first UE 805 may also receive one or more additional SSs (e.g., one or more additional SLSSs and/or S-SS/PSBCH blocks) from other UEs, such as one or more of the other RSUs 705 shown in FIG. 7. More particularly, as shown by reference number 835, the first UE 805 may receive, from the third UE 815, a third SS (e.g., a third SLSS and/or S-SS/PSBCH block) at another reception time. As shown in FIG. 8, in this example, the third SS is received by the first UE 805 later than the second SS. In some aspects, the third SS may be received by the first UE 805 later than the second SS because the third UE 815 is located farther from the first UE 805 than the second UE 810, and thus the third SS is subject to a greater propagation delay than the second SS. Additionally, or alternatively, in some aspects, the third SS may be received by the first UE 805 later than the second SS because a timing of the third UE 815 is later than a timing of the second UE 810 and thus the third SS is transmitted after the second SS. For example, the third UE 815 may be a level 4 RSU 705, as described in connection with FIG. 7, while the second UE 810 may be a level 3 RSU 705, and thus a timing of the second UE 810 may have less of a deviation from GNSS timing than a timing of the third UE 815.

As shown by reference number 840, in some aspects, the first UE 805 may determine that the transmission time of the first SS should be adjusted based at least in part on the reception time of the second SS, and not on the reception time of the third SS. In some aspects, the first UE 805 may make the determination indicated by reference number 840 based at least in part on the second SS being received prior in time to the third SS. More particularly, the second UE 810 and the third UE 815 may transmit the same SS (e.g., the same S-SS/PSBCH block), within a same resource set, but due to differences in timing and/or different propagation delays between the various UEs, the second SS and the third SS may result in multiple channel impulses, or taps, received by the first UE 805. In some aspects, the first UE 805 may adjust the first SS transmission timing based on the earliest arriving tap. In this way, the transmission time of the first SS may be beneficially set closer to the GNSS timing, because the earliest arriving tap may be associated with an SS having the least amount of propagation delay and/or may be an SS that originated from a UE closest to a level 2 device, and thus may represent an SS transmitted with the least amount of derivation from the GNSS timing.

As shown by reference number 845, in some aspects, the first UE 805 may adjust the transmission time of the first SS, resulting in an adjusted transmission time, that is based at least in part on the reception time of the second SS. In some aspects, adjusting the transmission time of the first SS may include compensating for a propagation delay associated with the second SS. More particularly, the reception time of the second SS may include some derivation from the GNSS timing based at least in part on a propagation delay between the first UE 805 and the second UE 810. Thus, the first UE may adjust the transmission time of the first SS by including a timing advance that accounts for a propagation delay, or the like.

More particularly, in some aspects, the adjusted transmission time of the first SS may be based at least in part on a compensation value that is associated with an estimated absolute timing delay between the first UE 805 and the second UE 810. The compensation value may be a period of time associated with the propagation delay between the first UE 805 and the second UE 810, and the first UE 805 may adjust the transmission time of the first SS by advancing the transmission time by the compensation value or by a value proportional to the compensation value. Returning to the example shown in FIG. 7, the estimated absolute timing delay between neighboring RSUs 705 is x microseconds. Thus, in that example, the first UE 805 (e.g., one of the RSUs 705) may advance the first SS transmission timing by x microseconds (or else by a time proportional to x microseconds, as will be more fully described below), in order to align the transmission timing with the GNSS timing. With respect to the SLSS timing chain shown in FIG. 7, each subsequent RSU 705 may similarly adjust its respective SS transmission timing based at least in part on the compensation value. Thus, the second RSU 705-2, when adjusting timing based at least in part on an SS received from the first RSU 705-1, may adjust its SS transmission time to account for the propagation delay, x microseconds, between the second RSU 705-2 and the first RSU 705-1; the third RSU 705-3, when adjusting timing based at least in part on an SS received from the second RSU 705-2, may adjust its SS transmission time to account for the propagation delay, x microseconds, between the third RSU 705-3 and the second RSU 705-2; and so forth. In this way, the deviation curve shown at reference number 725 may be flattened, such that RSUs 705 near the center of the structure 720 will have only relatively little deviation from GNSS timing (e.g., such that a maximal timing offset becomes much lower than the case shown by reference number 725).

In some aspects, the adjusted transmission time of the first SS may be further based at least in part on the compensation value being scaled by a stabilization factor. The stabilization factor may be used to prevent a positive feedback loop that may otherwise make the timing adjustment process unstable. For example, if the compensation value is very near or equal to the actual propagation delay between the first UE 805 and the second UE 810, the timing adjustment process may become unstable if, due to changing channel conditions or the like, the actual propagation delay falls below the compensation value. In such aspects, the first UE 805 would advance the first SS transmission timing to a point where, during the next SS transmission period, the first SS may arrive at the second UE 810 prior to the second UE 810 transmitting the second SS. In such a case, the second UE 810 may, in turn, adjust a transmission timing of the second SS based on the reception timing of the first SS. The second SS, once transmitted according to the adjusted transmission timing, may in turn be received at the first UE 805 prior to the first UE 805's adjusted transmission timing, triggering another adjustment by the first UE 805. The first UE 805 and the second UE 810 in such an example may thus create a positive feedback loop that quickly destabilizes sidelink, as the timing of the UEs 805, 810, and thus any other UE synchronized to the UEs 805, 810, will deviate significantly from GNSS timing.

Thus, in some aspects, the transmission timing of the first SS may be based at least in part on a product of the compensation value (e.g., the estimated absolute timing delay between the first UE 805 and the second UE 810) multiplied by the stabilization factor. Put another way, the adjusted transmission time of the first SS (sometimes referred to as "Adj. Tx Time($UE_1$)"), may be equal to the reception time of the earliest arriving SS (sometimes referred to as "Rx Time ($UE_1 \leftarrow UE_2$)"), minus the product of the stabilization factor (sometimes referred to as "a") and the compensation value (sometimes referred to as "comp. value"); that is, in some aspects, Adj. Tx Time ($UE_1$)=Rx Time ($UE_1 \leftarrow UE_2$)−α*(comp. value).

In some aspects, the stabilization factor may be less than one, such as when the stabilization factor is used to avoid a positive feedback loop, as described above. However, aspects of the disclosure are not so limited. For example, due to changing channel conditions or the like, in some aspects, the compensation value may be relatively small as compared to the actual propagation delay in the channel. Thus, in some aspects, the stabilization factor (e.g., a) may be greater than one in order to scale up the compensation value and thus reduce deviation from GNSS timing at each UE.

Moreover, the value of the stabilization factor may be based at least in part on various channel conditions, system architecture parameters, or the like. For example, in some aspects, the value of the stabilization factor may be based at least in part on a variation in distances between UEs forming an SLSS timing chain. Put another way, the value of the stabilization factor may be based at least in part on a variation in a first distance between the first UE 805 and the second UE 810 and a second distance between the first UE 805 and the third UE 815 (e.g., a higher variability in distances between neighboring UEs may result in a smaller stabilization factor). Additionally, or alternatively, the value of the stabilization factor may be based at least in part on an error associated with the estimated absolute timing delay between the first UE 805 and the second UE 810 (e.g., a lower accuracy in estimating the absolute timing delay between neighboring UEs may result in a smaller stabilization factor). Additionally, or alternatively, the value of the stabilization factor may be based at least in part on a probability that the first UE 805 receives one or more additional SSs from one or more other UEs (e.g., a higher probability that the first UE 805 receives additional SSs may result in a smaller stabilization factor).

In some aspects, each UE 805, 810, 815 may be configured with multiple SS resource sets (e.g., multiple S-SS/PSBCH blocks) for transmitting an SS in a given transmission cycle. For example, each UE may be configured with three resource sets per transmission cycle, with each resource set located at a different position in the time domain within the transmission cycle. In such aspects, the UEs 805, 810, 815 may transmit their respective SSs in same or different resource sets, and thus the first UE 805 may further compensate for a time domain difference between the resource sets. More particularly, in some aspects, the first UE 805 may transmit the first SS using a same resource set as a resource set used by the second UE 810, while in some other aspects, the first UE 805 may transmit the first SS in a different resource set than a resource set used by the second UE 810. In some aspects, the first UE 805 may compensate for the difference in transmission timing, as described above, projected onto the resource set used to transmit the first SS. Put another way, the first SS may be transmitted using a first SS resource set, of multiple SS resource sets, and the second SS may be transmitted using a second SS resource set, of the multiple SS resource sets, that is different than the first SS resource set. In such aspects, the first UE 805 may further adjust the transmission time of the first SS by compensating for a time domain difference between the first SS resource set and the second SS resource set.

As shown by reference number 850, in some aspects, the first UE 805 may transmit the first SS at the adjusted transmission time (e.g., by advancing the transmission time of the first SS by a time proportional to the compensation value, as described). More particularly, as shown by reference numbers 850a and 850b, the first SS may be transmitted to the second UE 810 or the third UE 815, respectively. If the second UE 810 or the third UE 815 receives the first SS prior to a current transmission time for the respective SSs, then the second UE 810 or the third UE 815 may adjust the transmission time for its respective SS in a similar manner as described above. For example, if the third UE 815 is farther from a level 2 device than the first UE 805, once the first UE 805 adjusts its transmission time as described above, thus more closely aligning the timing of the first UE 805 to the GNSS timing, the first SS may arrive at the third UE 815 prior to the transmission time of the third SS. Thus, the third UE 815 may adjust the transmission time of the third SS in a similar manner as described above (e.g., by advancing the transmission timing according to the product of the compensation value multiplied by the stabilization factor).

Additionally, or alternatively, the first SS may be transmitted to one or more additional UEs. For example, when the first UE 805 is an RSU 705 described in connection with FIG. 7, the first SS may be transmitted to an OBU 710 within the structure 720 (e.g., one of the second OBU 710-2 or the third OBU 710-3), which may synchronize its TTIs according to the first SS. Another OBU 710 may also be within the structure 720 (e.g., the other of the second OBU 710-2 or the third OBU 710-3), but may be nearer to another RSU 705 and thus may synchronize its TTIs according to another SS received from the other RSU 705. Nonetheless, because both RSUs 705 may compensate for propagation delays in the SLSS timing chain in a manner described above, the transmission times of both SSs may be near to one another (and to the GNSS timing, as described), thus permitting improved sidelink communications between the two OBUs 710.

As indicated above, FIG. 8 is provided as an example. Other examples may differ from what is described with respect to FIG. 8.

Figure 9:
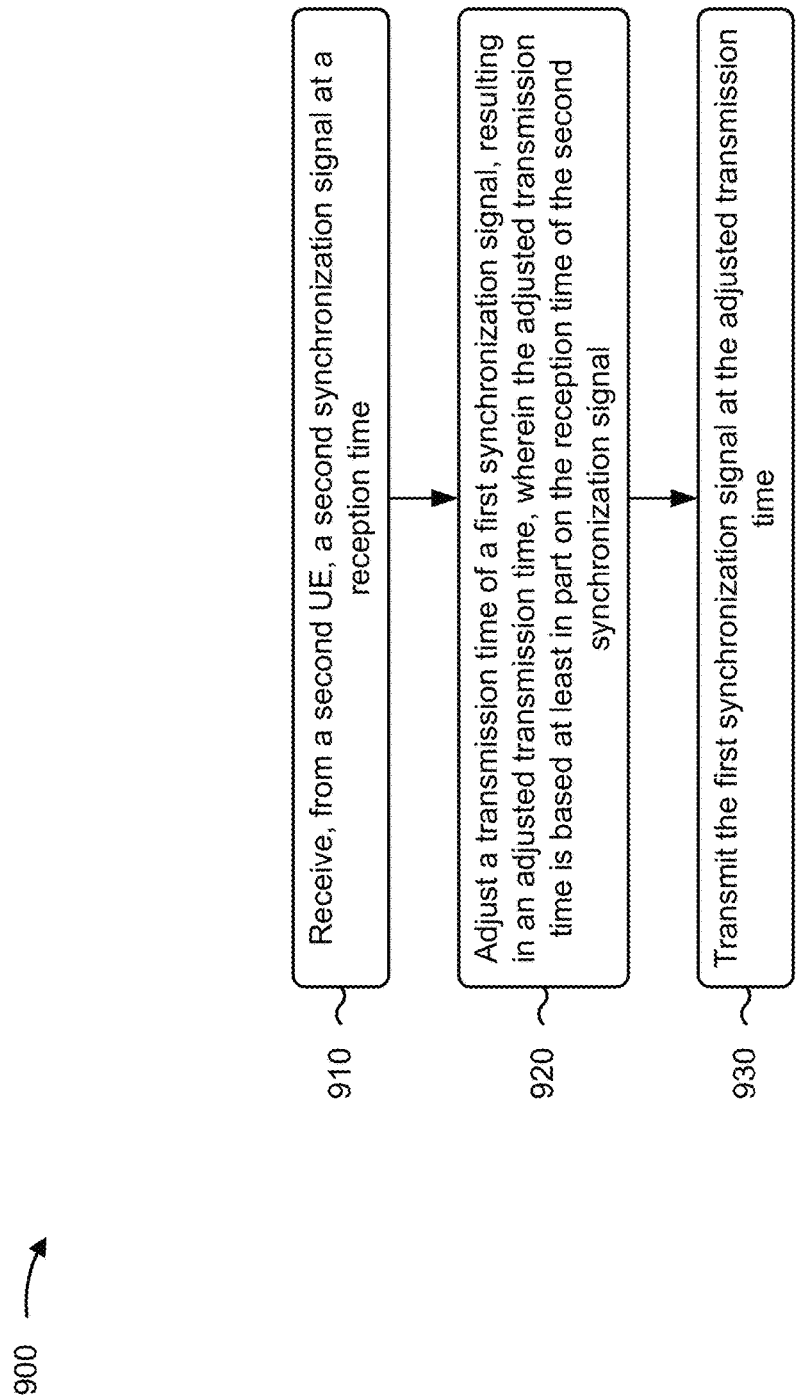
FIG. 9 is a diagram illustrating an example process performed, for example, by a first UE, in accordance with the present disclosure.

FIG. 9 is a diagram illustrating an example process 900 performed, for example, by a first UE, in accordance with the present disclosure. Example process 900 is an example where the first UE (e.g., UE 120, UE 405-1, UE 405-2, Tx/Rx UE 505, Rx/Tx UE 510, RSU 705, OBU 710, and/or first UE 805) performs operations associated with adjusting transmission timing of a synchronization signal based on a received synchronization signal timing.

As shown in FIG. 9, in some aspects, process 900 may include receiving, from a second UE, a second synchronization signal at a reception time (block 910). For example, the UE (e.g., using communication manager 1008 and/or reception component 1002, depicted in FIG. 10) may receive, from a second UE, a second synchronization signal at a reception time, as described above.

As further shown in FIG. 9, in some aspects, process 900 may include adjusting a transmission time of a first synchronization signal, resulting in an adjusted transmission time, wherein the adjusted transmission time is based at least in part on the reception time of the second synchronization signal (block 920). For example, the UE (e.g., using communication manager 1008 and/or adjustment component 1010, depicted in FIG. 10) may adjust a transmission time of a first synchronization signal, resulting in an adjusted transmission time, wherein the adjusted transmission time is based at least in part on the reception time of the second synchronization signal, as described above.

As further shown in FIG. 9, in some aspects, process 900 may include transmitting the first synchronization signal at the adjusted transmission time (block 930). For example, the UE (e.g., using communication manager 1008 and/or transmission component 1004, depicted in FIG. 10) may transmit the first synchronization signal at the adjusted transmission time, as described above.

Process 900 may include additional aspects, such as any single aspect or any combination of aspects described below and/or in connection with one or more other processes described elsewhere herein.

In a first aspect, the first UE and the second UE are roadside units.

In a second aspect, alone or in combination with the first aspect, the first UE and the second UE are not synchronized with a global navigation satellite system.

In a third aspect, alone or in combination with one or more of the first and second aspects, process 900 includes receiving, from a third UE, a third synchronization signal at another reception time, and determining that the adjusted transmission time should be based at least in part on the reception time and not on the other reception time based at least in part on the second synchronization signal being received prior in time to the third synchronization signal.

In a fourth aspect, alone or in combination with one or more of the first through third aspects, the adjusted transmission time is further based at least in part on a compensation value, and the compensation value is associated with an estimated absolute timing delay between the first UE and the second UE.

In a fifth aspect, alone or in combination with one or more of the first through fourth aspects, the adjusted transmission time is further based at least in part on the compensation value being scaled by a stabilization factor.

In a sixth aspect, alone or in combination with one or more of the first through fifth aspects, the adjusted transmission time is equal to the reception time minus a product of the compensation value and the stabilization factor.

In a seventh aspect, alone or in combination with one or more of the first through sixth aspects, a value of the stabilization factor is based at least in part on at least one of a variation in a first distance between the first UE and the second UE and a second distance between the first UE and a third UE, an error associated with the estimated absolute timing delay between the first UE and the second UE, or a probability that the first UE receives one or more additional synchronization signals from one or more other UEs.

In an eighth aspect, alone or in combination with one or more of the first through seventh aspects, the first synchronization signal is transmitted using a first synchronization signal resource set, of multiple synchronization signal resource sets, the second synchronization signal is transmitted using a second synchronization signal resource set, of the multiple synchronization signal resource sets, that is different than the first synchronization signal resource set, and adjusting the transmission time of the first synchronization signal further includes compensating for a time domain difference between the first synchronization signal resource set and the second synchronization signal resource set.

In a ninth aspect, alone or in combination with one or more of the first through eighth aspects, at least one of: the first UE is pre-configured with a configuration indicating that the first UE should adjust the transmission time of the first synchronization signal, or the first UE receives, from a network node, the configuration indicating that the first UE should adjust the transmission time of the first synchronization signal.

In a tenth aspect, alone or in combination with one or more of the first through ninth aspects, the configuration indicating that the first UE should adjust the transmission time of the first synchronization signal is transmitted by the network node using a spare bit in a master information block communication.

In an eleventh aspect, alone or in combination with one or more of the first through tenth aspects, the adjusted transmission time is further based at least in part on a compensation value associated with a propagation delay between the first UE and the second UE, and the configuration further indicates the compensation value.

In a twelfth aspect, alone or in combination with one or more of the first through eleventh aspects, the adjusted transmission time is further based at least in part on the compensation value being scaled by a stabilization factor, and the configuration further indicates the stabilization factor.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
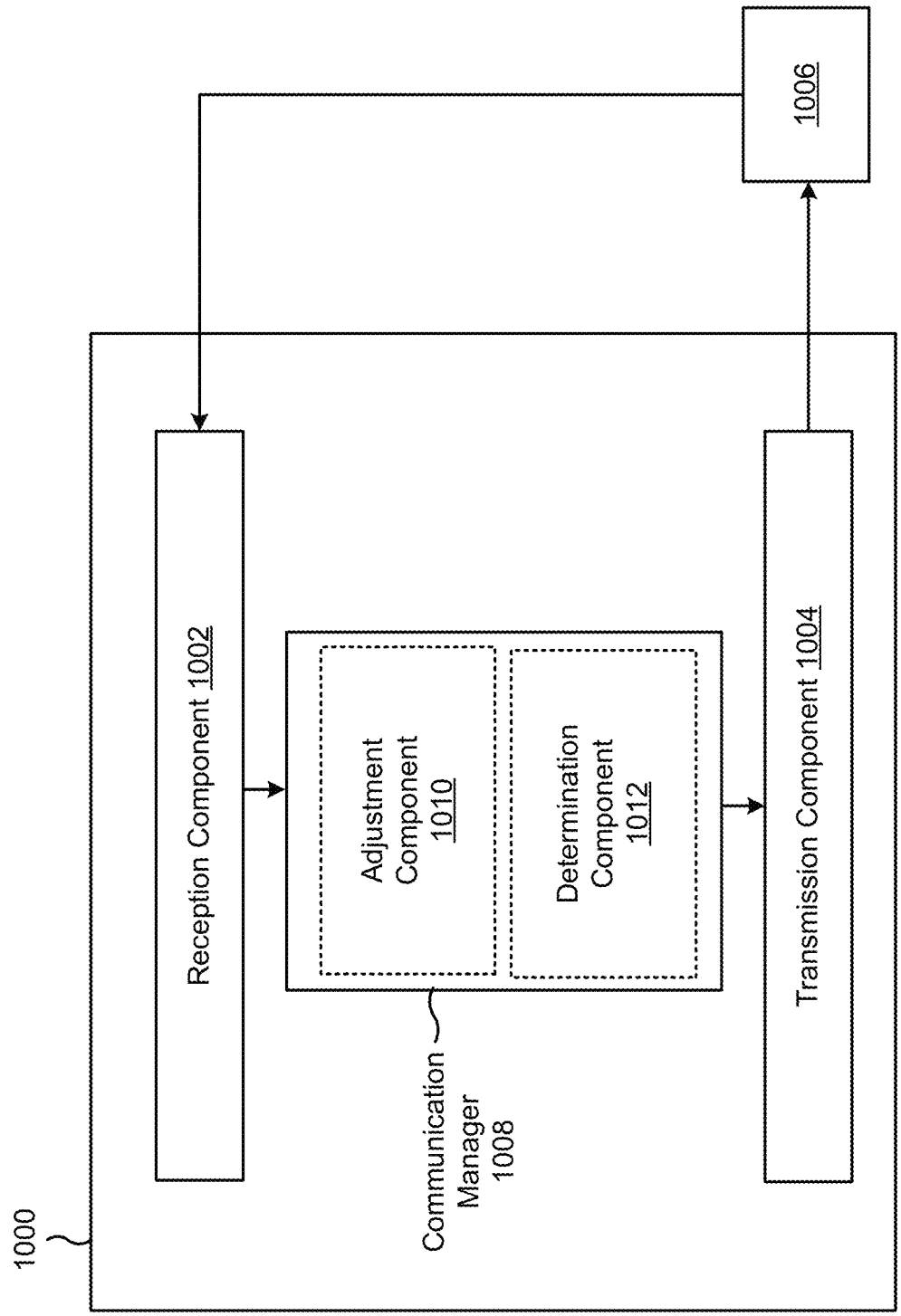
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a first UE (e.g., UE 120), or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008 (e.g., communication manager 140). The communication manager 1008 may include an adjustment component 1010, and/or a determination component 1012, among other examples.

In some aspects, the apparatus 1000 may be configured to perform one or more operations described herein in connection with FIG. 8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE 120 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first UE described in connection with FIG. 2. In some aspects, the transmission component 1004 may be co-located with the reception component 1002 in a transceiver.

The reception component 1002 may receive, from a second UE, a second synchronization signal at a reception time. The adjustment component 1010 may adjust a transmission time of a first synchronization signal, resulting in an adjusted transmission time, wherein the adjusted transmission time is based at least in part on the reception time of the second synchronization signal. The transmission component 1004 may transmit the first synchronization signal at the adjusted transmission time.

The reception component 1002 may receive, from a third UE, a third synchronization signal at another reception time. The determination component 1012 may determine that the adjusted transmission time should be based at least in part on the reception time and not on the other reception time based at least in part on the second synchronization signal being received prior in time to the third synchronization signal.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first user equipment (UE), comprising: receiving, from a second UE, a second synchronization signal at a reception time; adjusting a transmission time of a first synchronization signal, resulting in an adjusted transmission time, wherein the adjusted transmission time is based at least in part on the reception time of the second synchronization signal; and transmitting the first synchronization signal at the adjusted transmission time.

Aspect 2: The method of Aspect 1, wherein the first UE and the second UE are roadside units.

Aspect 3: The method of any of Aspects 1-2, wherein the first UE and the second UE are not synchronized with a global navigation satellite system.

Aspect 4: The method of any of Aspects 1-3, further comprising: receiving, from a third UE, a third synchronization signal at another reception time; and determining that the adjusted transmission time should be based at least in part on the reception time and not on the other reception time based at least in part on the second synchronization signal being received prior in time to the third synchronization signal.

Aspect 5: The method of any of Aspects 1-4, wherein the adjusted transmission time is further based at least in part on a compensation value, and wherein the compensation value is associated with an estimated absolute timing delay between the first UE and the second UE.

Aspect 6: The method of Aspect 5, wherein the adjusted transmission time is further based at least in part on the compensation value being scaled by a stabilization factor.

Aspect 7: The method of Aspect 6, wherein the adjusted transmission time is equal to the reception time minus a product of the compensation value and the stabilization factor.

Aspect 8: The method of any of Aspects 6-7, wherein a value of the stabilization factor is based at least in part on at least one of: a variation in a first distance between the first UE and the second UE and a second distance between the first UE and a third UE; an error associated with the estimated absolute timing delay between the first UE and the second UE; or a probability that the first UE receives one or more additional synchronization signals from one or more other UEs.

Aspect 9: The method of any of Aspects 1-8, wherein the first synchronization signal is transmitted using a first synchronization signal resource set, of multiple synchronization signal resource sets, wherein the second synchronization signal is transmitted using a second synchronization signal resource set, of the multiple synchronization signal resource sets, that is different than the first synchronization signal resource set, and wherein adjusting the transmission time of the first synchronization signal further includes compensating for a time domain difference between the first synchronization signal resource set and the second synchronization signal resource set.

Aspect 10: The method of any of Aspects 1-9, wherein at least one of: the first UE is pre-configured with a configuration indicating that the first UE should adjust the transmission time of the first synchronization signal, or the first UE receives, from a network node, the configuration indicating that the first UE should adjust the transmission time of the first synchronization signal.

Aspect 11: The method of Aspect 10, wherein the configuration indicating that the first UE should adjust the transmission time of the first synchronization signal is transmitted by the network node using a spare bit in a master information block communication.

Aspect 12: The method of any of Aspects 10-11, wherein the adjusted transmission time is further based at least in part on a compensation value associated with a propagation delay between the first UE and the second UE, and wherein the configuration further indicates the compensation value.

Aspect 13: The method of Aspect 12, wherein the adjusted transmission time is further based at least in part on the compensation value being scaled by a stabilization factor, and wherein the configuration further indicates the stabilization factor.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
one or more memories; and
one or more processors, coupled to the one or more memories, configured to:
receive, from a second UE, a second synchronization signal at a reception time;

adjust a transmission time of a first synchronization signal, resulting in an adjusted transmission time, wherein the adjusted transmission time is equal to the reception time minus a product of a compensation value and a stabilization factor; and transmit the first synchronization signal at the adjusted transmission time;

wherein the first synchronization signal is transmitted using a first synchronization signal resource set, of multiple synchronization signal resource sets, wherein the second synchronization signal is transmitted using a second synchronization signal resource set, of the multiple synchronization signal resource sets, that is different than the first synchronization signal resource set, and wherein adjusting the transmission time of the first synchronization signal further includes compensating for a time domain difference between the first synchronization signal resource set and the second synchronization signal resource set.

2. The apparatus of claim 1, wherein the first UE and the second UE are roadside units.

3. The apparatus of claim 1, wherein the first UE and the second UE are not synchronized with a global navigation satellite system.

4. The apparatus of claim 1, wherein the one or more processors are further configured to:

receive, from a third UE, a third synchronization signal at another reception time; and determine that the adjusted transmission time should be based at least in part on the reception time and not on the other reception time based at least in part on the second synchronization signal being received prior in time to the third synchronization signal.

5. The apparatus of claim 1, wherein the compensation value is associated with an estimated absolute timing delay between the first UE and the second UE.

6. The apparatus of claim 5, wherein a value of the stabilization factor is based at least in part on at least one of:

a variation in a first distance between the first UE and the second UE and a second distance between the first UE and a third UE;

an error associated with the estimated absolute timing delay between the first UE and the second UE; or a probability that the first UE receives one or more additional synchronization signals from one or more other UEs.

7. The apparatus of claim 1, wherein at least one of:

the first UE is pre-configured with a configuration indicating that the first UE should adjust the transmission time of the first synchronization signal, or the first UE receives, from a network node, the configuration indicating that the first UE should adjust the transmission time of the first synchronization signal.

8. The apparatus of claim 7, wherein the configuration indicating that the first UE should adjust the transmission time of the first synchronization signal is transmitted by the network node using a spare bit in a master information block communication.

9. The apparatus of claim 7, wherein the compensation value is associated with a propagation delay between the first UE and the second UE, and wherein the configuration further indicates the compensation value.

10. The apparatus of claim 7, wherein the configuration further indicates the stabilization factor.

11. A method of wireless communication performed by a first user equipment (UE), comprising:

receiving, from a second UE, a second synchronization signal at a reception time;

adjusting a transmission time of a first synchronization signal, resulting in an adjusted transmission time, wherein the adjusted transmission time is equal to the reception time minus a product of a compensation value and a stabilization factor; and transmitting the first synchronization signal at the adjusted transmission time;

wherein the first synchronization signal is transmitted using a first synchronization signal resource set, of multiple synchronization signal resource sets, wherein the second synchronization signal is transmitted using a second synchronization signal resource set, of the multiple synchronization signal resource sets, that is different than the first synchronization signal resource set, and wherein adjusting the transmission time of the first synchronization signal further includes compensating for a time domain difference between the first synchronization signal resource set and the second synchronization signal resource set.

12. The method of claim 11, wherein the first UE and the second UE are roadside units.

13. The method of claim 11, wherein the first UE and the second UE are not synchronized with a global navigation satellite system.

14. The method of claim 11, further comprising:

receiving, from a third UE, a third synchronization signal at another reception time; and determining that the adjusted transmission time should be based at least in part on the reception time and not on the other reception time based at least in part on the second synchronization signal being received prior in time to the third synchronization signal.

15. The method of claim 11, wherein the compensation value is associated with an estimated absolute timing delay between the first UE and the second UE.

16. The method of claim 15, wherein a value of the stabilization factor is based at least in part on at least one of:

a variation in a first distance between the first UE and the second UE and a second distance between the first UE and a third UE;

an error associated with the estimated absolute timing delay between the first UE and the second UE; or a probability that the first UE receives one or more additional synchronization signals from one or more other UEs.

17. The method of claim 11, wherein at least one of:

the first UE is pre-configured with a configuration indicating that the first UE should adjust the transmission time of the first synchronization signal, or the first UE receives, from a network node, the configuration indicating that the first UE should adjust the transmission time of the first synchronization signal.

18. The method of claim 17, wherein the configuration indicating that the first UE should adjust the transmission time of the first synchronization signal is transmitted by the network node using a spare bit in a master information block communication.

19. The method of claim 17, wherein the compensation value is associated with a propagation delay between the first UE and the second UE, and wherein the configuration further indicates the compensation value and the stabilization factor.

20. A non-transitory computer-readable medium storing a set of instructions for wireless communication, the set of instructions comprising:
  one or more instructions that, when executed by one or more processors of a first user equipment (UE), cause the UE to:
    receive, from a second UE, a second synchronization signal at a reception time;
    adjust a transmission time of a first synchronization signal, resulting in an adjusted transmission time, wherein the adjusted transmission time is equal to the reception time minus a product of a compensation value and a stabilization factor; and
    transmit the first synchronization signal at the adjusted transmission time;
    wherein the first synchronization signal is transmitted using a first synchronization signal resource set, of multiple synchronization signal resource sets,
    wherein the second synchronization signal is transmitted using a second synchronization signal resource set, of the multiple synchronization signal resource sets, that is different than the first synchronization signal resource set, and
    wherein adjusting the transmission time of the first synchronization signal further includes compensating for a time domain difference between the first synchronization signal resource set and the second synchronization signal resource set.

21. The non-transitory computer-readable medium of claim 20, wherein the one or more instructions further cause the UE to:
  receive, from a third UE, a third synchronization signal at another reception time; and
  determine that the adjusted transmission time should be based at least in part on the reception time and not on the other reception time based at least in part on the second synchronization signal being received prior in time to the third synchronization signal.

22. The non-transitory computer-readable medium of claim 20, wherein the compensation value is associated with an estimated absolute timing delay between the first UE and the second UE.

23. The non-transitory computer-readable medium of claim 20, wherein the first UE and the second UE are roadside units.

24. An apparatus for wireless communication, comprising:
  means for receiving, from a user equipment (UE), a second synchronization signal at a reception time;
  means for adjusting a transmission time of a first synchronization signal, resulting in an adjusted transmission time, wherein the adjusted transmission time is equal to the reception time minus a product of a compensation value and a stabilization factor; and
  means for transmitting the first synchronization signal at the adjusted transmission time;
  wherein the first synchronization signal is transmitted using a first synchronization signal resource set, of multiple synchronization signal resource sets,
  wherein the second synchronization signal is transmitted using a second synchronization signal resource set, of the multiple synchronization signal resource sets, that is different than the first synchronization signal resource set, and
  wherein adjusting the transmission time of the first synchronization signal further includes compensating for a time domain difference between the first synchronization signal resource set and the second synchronization signal resource set.

25. The apparatus of claim 24, wherein the compensation value is associated with an estimated absolute timing delay between the apparatus and the UE.

26. The apparatus of claim 24, wherein the apparatus and the UE are roadside units.

* * * * *